(12) United States Patent
Kutthumolu et al.

(10) Patent No.: US 12,463,967 B2
(45) Date of Patent: Nov. 4, 2025

(54) SYSTEM AND METHOD TO PERFORM LIGHT-BASED DATA EXCHANGE OPERATIONS

(71) Applicant: Bank of America Corporation, Charlotte, NC (US)

(72) Inventors: Durga Prasad Kutthumolu, Hyderabad (IN); Anurajam Rajagopalan, Chennai (IN); Subburathinam Krishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 18/594,599

(22) Filed: Mar. 4, 2024

(65) Prior Publication Data

US 2025/0279997 A1    Sep. 4, 2025

(51) Int. Cl.
*H04L 9/40* (2022.01)

(52) U.S. Cl.
CPC ........ *H04L 63/0861* (2013.01); *H04L 63/083* (2013.01)

(58) Field of Classification Search
CPC .......................... H04L 63/083; H04L 63/0861
See application file for complete search history.

(56) References Cited

U.S. PATENT DOCUMENTS

| | | | |
|---|---|---|---|
| 10,397,777 B2 * | 8/2019 | Kumar | ................. H04B 10/116 |
| 10,532,268 B2 | 1/2020 | Tran et al. | |
| 10,670,572 B2 | 6/2020 | Chadha et al. | |
| 11,170,437 B2 | 11/2021 | Yang | |
| 11,265,322 B2 | 3/2022 | Shen et al. | |
| 11,320,588 B1 | 5/2022 | Mazed | |
| 11,526,610 B2 | 12/2022 | Bacher et al. | |

(Continued)

FOREIGN PATENT DOCUMENTS

| | | |
|---|---|---|
| CN | 110739995 A | 1/2020 |
| CN | 114286206 A | 4/2022 |
| KR | 20180069356 A | 6/2018 |

OTHER PUBLICATIONS

Visible Light Communication, https://en.wikipedia.org/wiki/Visible_light_communication; printed Feb. 16, 2024.

(Continued)

*Primary Examiner* — Chau Le (57) ABSTRACT

A system comprises a memory communicatively coupled to at least one processor. The at least one processor is configured to receive a code-based data exchange request from a user. The code-based data exchange request comprises first user information associated with a user profile. Further, the at least one processor is configured to trigger a request for a retinal scan of the user in response to receiving the code-based data exchange request and receive a result of the retinal scan of the user. The result comprises second user information. The at least one processor is configured to determine that the code-based data exchange request is authentic in response to determining that the first user information and the second user information are associated with the user profile, convert the code-based data exchange request to a light-based data exchange request, and generate a light-guided contract based on the light-based data exchange request.

20 Claims, 2 Drawing Sheets

(56) References Cited

U.S. PATENT DOCUMENTS

| | | |
|---|---|---|
| 11,599,883 B2 | 3/2023 | Muthukrishnan et al. |
| 11,657,390 B2 * | 5/2023 | Xu ..................... G06Q 20/3674 |
| | | 705/44 |
| 2016/0284282 A1 * | 9/2016 | Zhang ..................... H05B 45/46 |
| 2018/0201226 A1 * | 7/2018 | Falkson ................ B60R 25/257 |
| 2020/0036443 A1 * | 1/2020 | Wang ..................... H04B 10/50 |
| 2020/0374277 A1 * | 11/2020 | Fuka ....................... H04L 63/18 |
| 2021/0160052 A1 | 5/2021 | Chalker |
| 2021/0256070 A1 | 8/2021 | Tran et al. |
| 2021/0304197 A1 | 9/2021 | Pomassl et al. |
| 2022/0179275 A1 | 6/2022 | Patterson et al. |
| 2022/0303006 A1 * | 9/2022 | Wang ..................... H05B 47/11 |
| 2023/0350999 A1 * | 11/2023 | Irwin, III .............. H04W 12/55 |

OTHER PUBLICATIONS

Visible Light Communication, https://nerd-corner.com/sending-text-messages-with-visible-light-communication; printed Feb. 16, 2024.

* cited by examiner

SYSTEM AND METHOD TO PERFORM LIGHT-BASED DATA EXCHANGE OPERATIONS

TECHNICAL FIELD

The present disclosure relates generally to light-based operations, and more specifically to a system and method to perform light-based data exchange operations.

BACKGROUND

In communication systems, multiple devices may perform data exchange operations with one another. In certain communication systems, there may be bad actors that attempt to intercept communications between the devices. These bad actors may implement a variety of approaches to gain access to lines of communication between the devices to obtain and/or modify data exchanged between the devices. Further, these bad actors may attempt to obtain and/or modify information associated with the devices or operators (e.g., users) of these devices.

SUMMARY OF THE DISCLOSURE

In one or more embodiments, systems and methods are configured to perform light-based data exchange operations. In particular, the system is configured to perform data exchange operations in a decentralized network (e.g., a blockchain network) using light-guided contracts and an optical-based ledger on preventing our problem statement. The system may be configured to enable data exchange operations through smart contracts in the decentralized network based on one or more requests received from one or more users. The systems may be configured to trigger any data exchange transactions using light-based triggers instead of code-based triggers. In this regard, signatures of light patterns may be used to confirm and/or verify information in databases instead of structured data associated with code-based communications. In some embodiments, the system is configured to convert code-based data exchange requests from a user to light-based data exchange requests using at least one Artificial Intelligent model. The system may be configured to request a retinal scan from the user to validate users making any requests. In certain embodiments, light communications may be encoded and/or decoded in accordance with one or more rules and policies of an organization. The light communications may be exchanged using networks configured to handle visible light communication technologies (e.g., LI-FI networks).

In one or more embodiments, the system described herein are integrated into a practical application of performing light-based data exchange operations. For example, the system enables light-based communications in a system configured to perform one or more data exchange operations in a decentralized network. The light-based communications are harder to intercept and more difficult to decode as light is transmitted at near-instant speeds. In some embodiments, the system is integrated in the practical application of encoding and/or decoding light-based communications exchanged between one or more devices. In some embodiments, the light-based communications are secured by performing light-based authentication of a user generating a data exchange request.

In one or more embodiments, the system is directed to improvements in computer systems. Specifically, the system reduces processor and memory usage in servers and/or user devices by converting code-based data exchange request to light-based data exchange requests. In particular, the system is configured to reduce and/or eliminate data interceptions from bad actors in a communication network. In some embodiments, by converting the code-based requests to light-based requests, the systems may dynamically transform code-based communications into light-based communications. In this regard, memory usage is reduced because subsequent transactions performed by the system rely on near-instant analysis and/or processing allowed by light-based communications. Further, processing speeds are increased by implementing the system because light-based communications enable near-instant verification of data by comparing signatures of a light-based communication.

In one or more embodiments, the systems may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store one or more user profiles. Each user profile may comprise that at least one user is entitled to perform one or more data exchange operations in a decentralized network. The at least one processor is configured to receive a code-based data exchange request from a user. The code-based data exchange request may comprise first user information associated with a user profile and data exchange information associated with a data exchange operation. Further, the at least one processor is configured to trigger a request for a retinal scan of the user in response to receiving the code-based data exchange request and receive a result of the retinal scan of the user. The result may represent second user information. The at least one processor may be configured to determine whether the first user information and the second user information are associated with the user profile in response to receiving the result of the retinal scan of the user, determine that the code-based data exchange request is authentic in response to determining that the first user information and the second user information are associated with the user profile, convert the code-based data exchange request to a light-based data exchange request, and generate a light-guided contract based on the light-based data exchange request. The light-guided contract indicating that the user associated with the user profile is entitled to trigger the data exchange operation. The at least one processor is configured to generate a light-based token to initiate the data exchange operation with the decentralized network and transmit the light-based token to the decentralized network.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
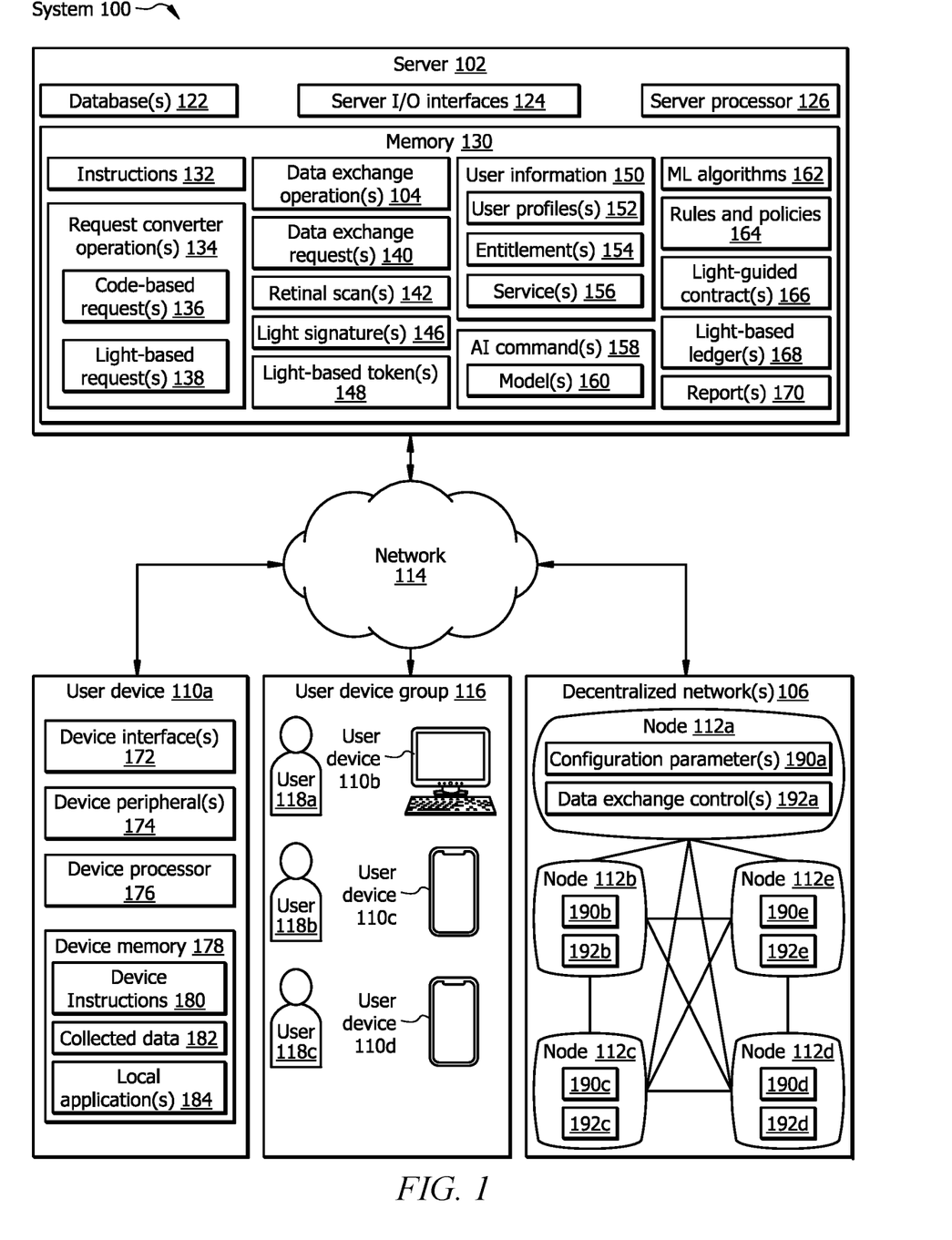
FIG. 1 illustrates a system in accordance with one or more embodiments.
Figure 2:
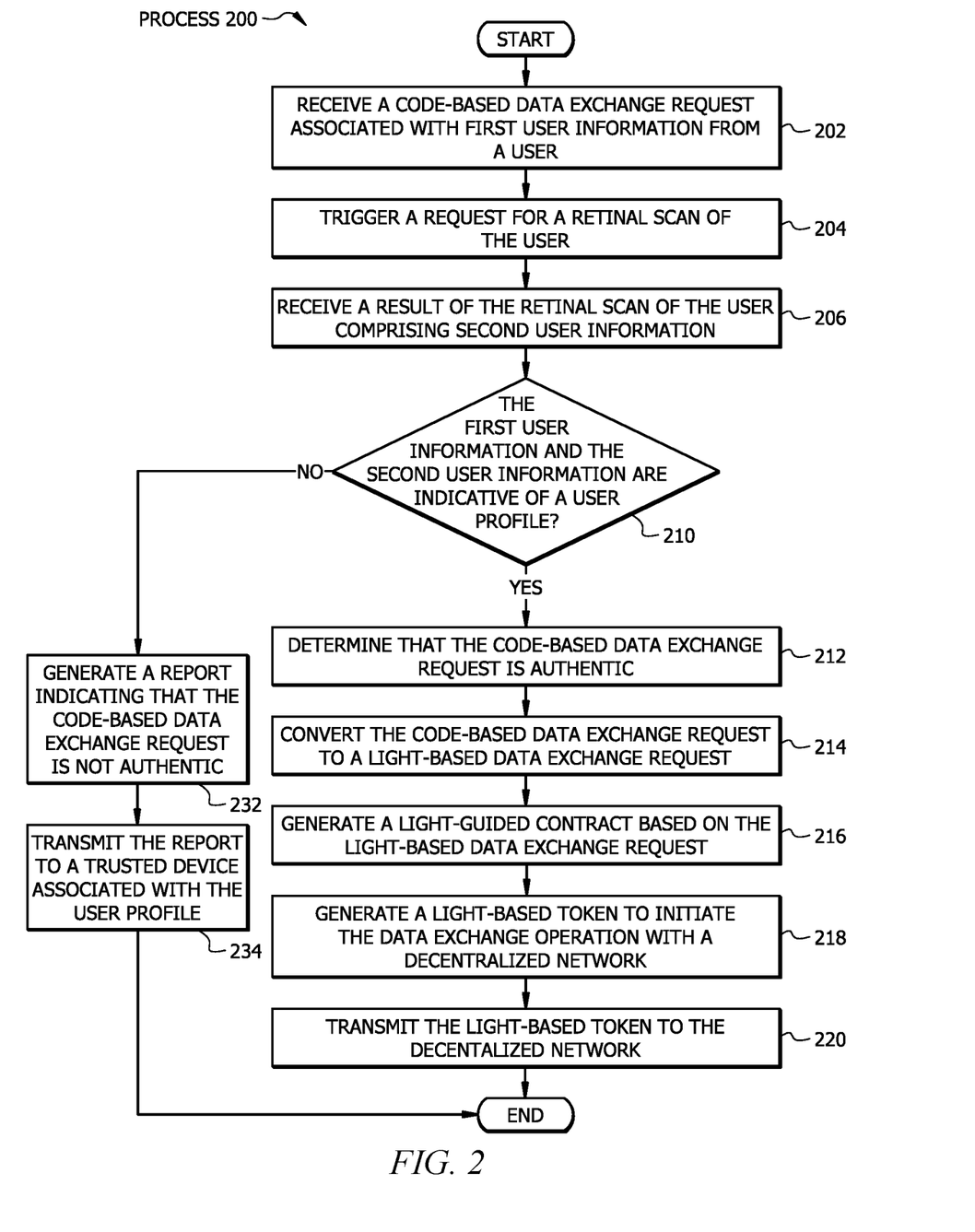
FIG. 2 illustrates an example flowchart of a method to perform light-based data exchange operations in accordance with one or more embodiments.

As described above, this disclosure provides various systems and methods configured to perform light-based data exchange operations. FIG. 1 illustrates a system 100 in which a server 102 performs one or more data exchange operations 104 with one or more decentralized networks 106. FIG. 2 illustrates a process 200 performed by the system 100 of FIG. 1.

System Overview

FIG. 1 illustrates an example system 100, in accordance with one or more embodiments. The system 100 may comprise a server 102 configured to perform one or more light-based data exchange operations 104 in one or more decentralized networks 106. The system 100 includes a server 102 communicatively coupled to a user device 110a, a user device 110b, a user device 110c, and a user device 110d (collectively, user devices 110) and/or a node 112a, a node 112b, a node 112c, a node 112d, and a node 112e (collectively, nodes 112) in the one or more decentralized networks 106 via a network 114. The user devices 110 may be working nodes configured to receive instructions to perform one or more data exchange operations 104 based on instructions received from the server 102. In some embodiments, some of the user devices 110 may be clustered together in a user device group 116. Each of the user devices 110 may be associated with one or more corresponding operators. These operators are shown as a user 118a, a user 118b, and a user 118c (collectively, users 118) in the user device group 116. In FIG. 1, the user 118a is shown associated with the user device 110b, the user 118b is shown associated with the user device 110c, and the user 118c is shown associated with the user device 110d.

In one or more embodiments, the server 102 may comprise one or more databases 122, one or more server input (I)/output (O) interfaces 124, at least one server processor 126, and at least one memory 130 communicatively coupled to one another. In some embodiments, the memory 130 may comprise instructions 132, one or more request converter operations configured to convert one or more code-based requests 136 into one or more light-based requests 138 and/or one or more light-based requests 138 into one or more code-based requests 136, one or more data exchange requests 140, the one or more data exchange operations 104, one or more retinal scans 142, one or more light signatures 146, one or more light-based tokens 148 to be used in the one or more decentralized networks 106, user information 150 configured to associate one or more user profiles 152 with one or more entitlements 154 to access one or more services 156, one or more artificial intelligence (AI) commands configured to train one or more cognitive AI models 160, one or more machine learning (ML) algorithms 162, one or more rules and policies 164, one or more light-guided contracts 166, one or more light-based ledgers 168, and one or more reports 170.

Referring to the user device 110a a non-limiting example, the user device 110a may comprise one or more device interfaces 172, one or more server peripherals 174, at least one server processor 176, and at least one server memory 178 communicatively coupled to one another. The server memory 178 may comprise server instructions 180, collected data 182, and/or one or more local applications 184.

Referring to the node 112a a non-limiting example, the node 112a may comprise one or more configuration parameter 190a and/or one or more data exchange controls 192a. In the example of FIG. 1, the node 112b includes one or more configuration parameter 190b and/or one or more data exchange controls 192b, the node 112c includes one or more configuration parameter 190c and/or one or more data exchange controls 192c, the node 112d includes one or more configuration parameter 190d and/or one or more data exchange controls 192d, and the node 112e includes one or more configuration parameter 190e and/or one or more data exchange controls 192e.

System Components

Server

The server 102 is generally any device or apparatus that is configured to process data and communicate with computing devices (e.g., the user devices 110 and/or the nodes 112), additional databases, systems, and the like, via the one or more server I/O interfaces 124 (i.e., a user interface or a network interface). The server 102 may comprise the server processor 126 that is generally configured to oversee operations of the processing engine. The operations of the processing engine are described further below in conjunction with the system 100 described in FIG. 1 and the process 200 described in FIG. 2.

The server 102 comprises multiple databases 122 configured to provide one or more memory resources to the server 102 and/or the user devices 110. The server 102 comprises the server processor 126 communicatively coupled with the databases 122, the server I/O interfaces 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to act as a halfway point in between one or more services 156 and other tools or databases.

In one or more embodiments, the server I/O interfaces 124 may be configured to enable wired and/or wireless communications. The server I/O interfaces 124 may be configured to communicate data between the server 102 and other user devices (i.e., the user devices 110 and/or the node 112), network devices (i.e., routers in the network 114), systems, or domain(s) via the network 114. For example, the server I/O interfaces 124 may comprise a WI-FI interface, a LAN interface, a WAN interface, a modem, a switch, or a router. The server processor 126 may be configured to send and receive data using the server I/O interfaces 124. The server I/O interfaces 124 may be configured to use any suitable type of communication protocol. In some embodiments, the server I/O interfaces 124 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services 156. In this regard, the services 156 are developed and deployed as part of at least one domain. In other embodiments, one instance of the managed servers in the middleware server domain may be configured as the server 102. The server 102 provides a central point for managing and configure the managed servers and any of the one or more services 156.

The server processor 126 comprises one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processor 126 are configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more server processor 126 are configured to execute various instructions. For example, the one or more server processor 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol as would be appreciated by one of ordinary skill in the art. In one or more embodiments, the server I/O interfaces 124 may comprise one or more sensors configured to evaluate physical phenomena surrounding the server 102 and/or one or more of the user devices 110. The sensors may be proximity sensors, optical sensors, and the like.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more request converter operations 134 comprising the one or more code-based requests 136 and/or the one or more light-based requests 138, the one or more data exchange requests 140, the one or more data exchange operations 104, the one or more retinal scans 142, the one or more light signatures 146, the one or more light-based tokens 148, the user information 150 comprising the one or more user profiles 152 associated with the one or more entitlements 154 to access and/or modify the one or more services 156, the one or more AI commands 158 comprising one or more models 160, the one or more algorithms 162, the one or more rules and policies 164, the one or more light-guided contracts 166, the one or more light-based ledgers 168, and the one or more reports 170. The instructions 132 may comprise any suitable set of instructions, logic, rules, or code operable to execute the server processor 126.

The one or more converter operations 134 may be one or more operations configured to convert one or more of the code-based requests 136 to corresponding one or more of the light-based requests 138. Further, the one or more converter operations 134 may be one or more operations configured to convert one or more of the light-based requests 138 to corresponding one or more of the code-based requests 136. The one or more code-based requests 136 may be one or more information strings, alphanumeric data, and/or configuration commands to be exchanged in a data network. The one or more light-based requests 138 may be a collection of light-based information to be exchanged in a light network. The code-based requests 136 and the light-based requests 138 may be data exchange requests 140 configured to trigger one or more of the data exchange operations 104. The code-based requests 136 and the light-based requests 138 may be exchanged in bulk or individually over the network 114.

The one or more data exchange requests 140 may be one or more communications configured to provide triggers in the form of communication or control signals to start operations such as fetching the instructions 132 or running one or more of data exchange operations 104. The data exchange requests 140 may provide user information 150 to the server 102 to indicate at least one user profile 152 associated with one or more of the entitlements 154 to access and/or modify any of the services 156 available in the server 102. The data exchange requests 140 may be configured to provide lists, security information, and configuration commands that the server 102 uses to set up a specific service 156 for one of the user devices 110. The data exchange requests 140 may comprise data that provides starting procedure configuration to the server 102. In one or more embodiments, the data exchange requests 140 may be optimized instructions that trigger establishing of a specific procedure in the server 102.

The one or more retinal scans 142 are light representations of optical scans of one or more user retinas. The one or more retinal scans 142 may be obtained in accordance with one or more photosensitive light accurate detection (LAD) operations performed one or more of the server I/O interfaces 124. The LAD operations may comprise prompting a user to provide access for an optical scan. In this regard, the user (e.g., one of the users 118) may look to one of the server I/O interfaces configured to perform the optical scan. The retinal scans 142 may be one or more copies of the collected data 182 collected by one or more of the user devices 110. The one or more light signatures 146 may be light-based representation of the retinal scans 142, the one or more light-based tokens 148, and/or the user information 150. The light signatures 146 may be light-based representations of light information in a visible spectrum. The light signatures 146 may be data representative of datapoints in a light spectrum.

In one or more embodiments, the data exchange operations 104 are configured to create, analyze, manage, and update one or more light-based tokens 148. The data exchange operations 104 may be configured to communicate one or more of the data exchange requests 140 with the one or more decentralized networks 106 via user and/or network interfaces and connections. The data exchange operations 104 may be configured to perform one or more of the operations in the process 200 described in reference to FIG. 2. In some embodiments, the data exchange operations 104 may be configured to update one or more user profiles 152 in the user information 150. In some embodiments, the server 102 may be configured to generate the light-based tokens 148 to perform one or more of the data exchange operations 104 with the decentralized network 106 as triggered by one or more of the user devices 110.

In yet other embodiments, one or more of the user devices 110 may request the decentralized networks 106 via the server 102 to generate the light-based tokens 148 dynamically or periodically over time in accordance with one or more token attributes. The token attributes may at least partially represent any of the data exchange requests 140 from the user devices 110. The triggers received from the user devices 110 may be referenced as part of one or more token attributes. In some embodiments, the light-based tokens 148 may be a non-fungible token (NFT) that is generated along encrypted geolocation of the user device and point-of-exchange (PoE) information. The PoE information may comprise location information in which a data exchange request is triggered by one of the user devices. In some embodiments, the PoE information indicate a relation between the light-based tokens 148, the entitlements 154, and one or more reports 170 (e.g., receipts) obtained when a data exchange is attempted. The light-based tokens 148 may be a string of numbers, alphanumeric characters, one or more words or phrases, one or more letters, and/or symbols. In some embodiments, the light-based tokens 148 are generated in accordance with one or more token attributes. The server 102 may be configured to present data exchange output receipts in one or more reports 170 to the user devices 110.

The user information 150 may comprise the one or more user profiles 152, one or more entitlements 154, and one or more services 156. In one or more embodiments, the user profiles 152 may comprise multiple profiles associated with one or more entitlements 154 to access and/or modify the services 156. Each of the user profiles 152 may be associated with one or more entitlements 154. The entitlements 154 may indicate that a given user device 110 is allowed to access one or more network resources in accordance with the one or more rules and policies 164. The entitlements 154 may indicate that a given user device 110 is allowed to perform one or more operations in the system 100 (e.g., provide a specific application data access to one of the users 118). To secure or protect operations of the user devices 110 from bad actors, the entitlements 154 may be assigned to a given user profile 152 in accordance with updated security information, which may provide guidance parameters to the use of the entitlements 154 based at least upon corresponding rules and policies 164. In one or more embodiments, the one or more services 156 are access to one or more application operations performed in accordance with the application data. In some embodiments, the user profiles 152 may comprise multiple profiles for users (e.g., user 118). Each user profile 152 may comprise one or more entitlements 154. As described above, the entitlements 154 may indicate that a given user 118 is allowed to access one or more network resources in accordance with one or more rules and policies 164. The entitlements 154 may indicate that a given user is allowed to perform one or more data exchanges with the light-based tokens 148 via the decentralized networks 106. In one or more embodiments, each of the user profiles 152 may comprise information about at least one user 118 entitled to trigger one or more data exchange operations 104 in the decentralized network 106.

In one or more embodiments, the ML algorithms 162 may be executed by the server processor 126 to evaluate the data exchange requests 140. Further, the ML algorithms 162 may be configured to interpret and transform the data exchange requests 140 and/or the instructions 132 into structured data sets and subsequently stored as files or tables. The ML algorithms 162 may cleanse, normalize raw data, and derive intermediate data to generate uniform data in terms of encoding, format, and data types. The ML algorithms 162 may be executed to run user queries and advanced analytical tools on the structured data. The ML algorithms 162 may be configured to generate the one or more AI commands 158 based on one or more results of the testing operations. The AI commands 158 may be parameters that proactively trigger one or more of the request converter operations 134 to convert any code-based requests 136 received into one or more light-based requests 138. The AI commands 158 may be combined with the existing instructions 132 to dynamically trigger and/or perform the data exchange operations 104. The AI commands 158 may be configured to trigger one or more cognitive AI operations in accordance with one or more models 160. The models 160 may be trained by the one or more ML algorithms 162 based on historic information associated with any data exchange operations 104 performed with the server 102.

The rules and policies 164 may be security configuration commands or regulatory operations predefined by an organization or one or more users 118. In one or more embodiments, the rules and policies 164 may be dynamically defined by the one or more users 118. The rules and policies 164 may be prioritization rules configured to instruct one or more user devices 110 to perform one or more testing operations or perform one or more operations in the system 100 in a specific data exchange request 140. The one or more rules and policies 164 may be predetermined or dynamically assigned by a corresponding user 118 or an organization associated with the users 118.

The one or more light-guided contracts 166 may be configured to maintain one or more light-based tokens 148. The one or more light-based ledgers 168 may be configured to monitor use of the light-based tokens 148 in the decentralized networks 106. The one or more reports 170 may be one or more receipts associated with completion of the data exchange requests 140. In one or more embodiments, the light-guided contracts 166 and the one or more light-based ledgers 168 may be accessed upon validating the identity of the users 118. The validation of the identity of the users 118 may be performed based on identifying one or more retinal scans 142 of the users 118.

In one or more embodiments, the data exchange operations 104 may be one or more operations configured to be performed at multiple locations. The data exchange operations 104 may be operations distributed to exchange one or more data objects associated with one or more user devices 110. The data exchange operations 104 may be distributed in multiple locations physically separated from one another. The data exchange operations 104 may be testing operations performed to evaluate one or more portions of application data associated with one or more of the services 156.

In one or more embodiments, the databases 122 may be one or more light-based repositories configured to store light-based information. In one example, the server 102 may determine the server processor 126 is available (e.g., running) to perform a specific service 156. In another example, the server 102 may determine that a specific managed server is running to enable a testing application and/or perform the specific service 156 upon receiving a server response indicating that a corresponding managed server is available to perform the service 156. The databases 122 may be configured to store one or more light representations of data instead of storing coded data. In this regard, the light representations may be encoded in accordance with a light-based encoder configured to identify and/or verify light-based information. For example, the databases 122 may comprise one or more light representations of the retinal scans 142. As the retinal scans 142 are received from the user devices 110, the server processor 126 may be configured to compare the retinal scans 142 with a light-based representation of a previous version of a retinal scan 142 for a specific user 118. The comparison may be performed instantaneously or near-instantaneously (e.g., faster than comparing coded data) as light speed enables faster processing operations.

User Device

In one or more embodiments, each of the user devices 110 (e.g., the user device 110a and/or the user devices 110b-110d in the device group 116) may be any computing device configured to communicate with other devices, such as the server 102, other user devices 110 in the user device group 116, databases, and the like in the system 100. Each of the user devices 110 may be configured to perform specific functions described herein and interact with the server 102 and/or any other user devices 110. Examples of the user devices 110 comprise, but are not limited to, a laptop, a computer, a smartphone, a tablet, a smart device, an IoT device, a simulated reality device, an augmented reality device, or any other suitable type of device. The data exchange requests 140 may be provided by the user devices 110 via one or more interfaces comprising input displays, voice microphones, or sensors capturing gestures performed by a corresponding user 118.

The user devices 110 may be hardware configured to create, transmit, and/or receive information. The user devices 110 may be configured as a provider node or as worker nodes. The user devices 110 may be configured to receive inputs from a user, process the inputs, and generate data information or command information in response. The data information may include documents or files generated using a graphical user interface (GUI).

Referring to the user device 110a as a non-limiting example, the command information may include input selections/commands triggered by a user using a peripheral component or one or more device peripherals 174 (i.e., a keyboard) or an integrated input system (i.e., a touchscreen displaying the GUI). The user devices 110 may be communicatively coupled to the server 102 via a network connection (i.e., the device peripherals 174). The user devices 110 may transmit and receive data information, command information, or a combination of both to and from the server 102 via the server interfaces 172. In one or more embodiments, the user devices 110 are configured to exchange data, commands, and signaling with the server 102. In some embodiments, the user devices 110 are configured to receive at least one firewall configuration from the server 102 to implement a firewall (one of the one or more local applications) at one of the user devices 110.

In one or more embodiments, the server interfaces 172 may be any suitable hardware or software (e.g., executed by hardware) to facilitate any suitable type of communication in wireless or wired connections. These connections may comprise, but not be limited to, all or a portion of network connections coupled to additional user devices 110, the server 102, the Internet, an Intranet, a private network, a public network, a peer-to-peer network, the public switched telephone network, a cellular network, a LAN, a MAN, a WAN, and a satellite network. The device interfaces 172 may be configured to support any suitable type of communication protocol.

In one or more embodiments, the one or more device peripherals 174 may comprise audio devices (e.g., speaker, microphones, and the like), input devices (e.g., keyboard, mouse, and the like), or any suitable electronic component that may provide a modifying or triggering input to the user devices 110. For example, the one or more device peripherals 174 may be speakers configured to release audio signals (e.g., voice signals or commands) during media playback operations. In another example, the one or more device peripherals 174 may be microphones configured to capture audio signals. In one or more embodiments, the one or more device peripherals 174 may be configured to operate continuously, at predetermined time periods or intervals, or on-demand.

The device processor 176 may comprise one or more processors communicatively coupled to and in signal communication with the device interfaces 172, the device peripherals 174, and the device memory 178. The device processor 176 is any electronic circuitry, including, but not limited to, state machines, one or more CPU chips, logic units, cores (e.g., a multi-core processor), FPGAs, ASICs, or DSPs. The device processor 176 may be a programmable logic device, a microcontroller, a microprocessor, or any suitable combination of the preceding. The one or more processors in the device processor 176 are configured to process data and may be implemented in hardware or software executed by hardware. For example, the device processor 176 may be an 8-bit, a 16-bit, a 32-bit, a 64-bit, or any other suitable architecture. The device processor 176 may comprise an ALU to perform arithmetic and logic operations, processor registers that supply operands to the ALU, and store the results of ALU operations, and a control unit that fetches software instructions such as device instructions 180 from the device memory 178 and executes the device instructions 180 by directing the coordinated operations of the ALU, registers, and other components via a device processing engine (not shown). The device processor 176 may be configured to execute various instructions.

The device memory 178 may comprise multiple operation data and one or more local applications 184 associated with the server 102. The operation data may be data configured to enable one or more data processing operations such as those described in relation with the server 102. The operation data may be partially or completely different from those comprised in the memory 130. The local applications 184 may be one or more of the services described in relation with the server 102. In some embodiments, the local applications 184 may be partially or completely different from those comprised in the memory 130.

In one or more embodiments, the collected data 182 may be one or more light-based information and/or code-based information collected by the user device 110a using the device interfaces 172 and/or the device peripherals 174. For example, the collected data 182 may be one or more of the retinal scans 142 collected using an optical sensor before being transferred to the server 102.

Network

The network 114 facilitates communication between and amongst the various devices of the system 100. The network 114 may be any suitable network operable to facilitate communication between the server 102 and the user devices 110 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices. The network 114 may be a light-based network configured to provide communications using fiber optical cables and/or other infrastructure configured to transfer light.

Decentralized Network

In one or more embodiments, the decentralized networks 106 comprises a peer-to-peer networking protocol that enables development of serverless applications. The decentralized networks 106 may include multiple electronic components or devices (i.e., nodes 112) comprising specific node data. The nodes 112 may not be required to store or validate all data in the decentralized network 106. Instead, validation of each node's data may be obtained via peer accountability. The decentralized networks 106 may be a blockchain network configured to perform one or more decentralized operations.

In some embodiments, the nodes 112 may include only their own data and a reference to all other data in a given decentralized network 106 in accordance with rules and policies 164 preestablished by an electronic component or device outside the given decentralized network 106 (e.g., one or more servers, such as the server 102). Each node may comprise one or more configuration parameters 190 and/or one or more data exchange controls 192. The configuration parameters 190 may determine how the nodes 112 interact with each other and the server 102. The configuration parameters 190 may be updated dynamically or periodically with additional data received as updates via one or more planning components (e.g., electronic devices or components configured to provide updates to the configuration parameters 190). The updates may be triggered by a perceived lack of knowledge level in the nodes 112. A perceived knowledge level in the nodes 112 may be identified via node scores (not shown) received from the server 102 as feedback.

In one or more embodiments, each node (i.e., out of nodes 112) in the given decentralized network 106 includes knowledge-specific information and information associated with peer accountability and a perceived knowledge level. Specifically, referencing the node 112a as a non-limiting example, includes configuration parameters 190a and data exchange controls 192a. The data exchange controls 192a may include information corresponding to at least one knowledge domain configured to perform interactions of one or more user devices 110. In one or more embodiments, the node 112a may be configured to receive one or more of initial tokens. Upon receiving the light-based tokens 148, the node 112a may be configured to determine whether any of entitlements 154 of the initial tokens correspond to the knowledge information included in the data exchange controls 192a.

In other embodiments, the node 112a includes a processor (not shown) configured to provide updates corresponding to specific updated data exchange controls 192a. The processor in the node 112a may be configured to provide updated tokens directly to the server processor 126. Further, the processor of the node 112a may be configured to route any initial tokens that are not updated to one of the other nodes 112 in accordance with one or more configuration parameters 190 governing the given decentralized network 106. The data exchange controls 192 at a given node 112 may be configured to generate a light-based token 148 representative of a data exchange request 140 and perform a corresponding interaction in one or more of the decentralized networks 106. In some embodiments, the data exchange controls 192 may enable the light-based tokens 148 to perform interactions between a first decentralized network 106 and a second decentralized network 106. Each of the decentralized networks 106 may comprise corresponding configuration information configured to interpret the data exchange requests 140 in the given light-based tokens 148.

In the example of FIG. 1, a representation of the decentralized networks 106 includes five nodes 112a-112e. However, additional nodes or fewer nodes may be included. In some embodiments, each of the nodes 112 includes corresponding configuration parameters 190 and corresponding data exchange controls 192. In the decentralized networks 106 of FIG. 1, the node 112a includes the configuration parameters 190a and the updated data exchange controls 192a; the node 112b includes the configuration parameters 190b and the updated data exchange controls 192b; the node 112c includes the configuration parameters 190c and the updated data exchange controls 192c; the node 112d includes the configuration parameters 190d and the updated data exchange controls 192d; and the node 112e includes the configuration parameters 190e and the updated data exchange controls 192e.

Operational Flow

In one or more embodiments, the user devices 110 are endpoints (e.g., ATM, user device) configured to request access to network resources using light-based operations. The user device 110 may comprise an optical sensor configured to collect data 182 comprising a retinal scan 142. The retinal scan 142 may be configured to authenticate a corresponding user 118 at the user device 110 before the light-based operations are started. Once authenticated, the corresponding user 118 may request blockchain/quantum network operations at the endpoint using one or more code-based requests 136. The endpoint may translate the code-based requests 136 to light-based requests 138 using cognitive AI. The light-based requests 138 may include information used as a basis to start a light-guided contract 166 at the server 102. The endpoint then may provide the light-based requests 138 to the server 102. Once the light-based requests 138 are authenticated at the server 102, the endpoint receives an approval to establish a light-based communication link with the server 102. The light-based operations may be performed using Li-Fi technology.

In one or more embodiments, the server 102 may be configured to create light-guided contracts 166 to access banking resources using light-based operations. The server 102 may be configured to trigger decentralized/quantum network operations using the network resources based on information obtained in one or more light-based requests 138 received from a user device 110 acting as an endpoint. The light-guided contracts 166 may be created and/or updated for each transaction performed by a corresponding user 118. Once the light-based request 138 is authenticated at the server 102, the server 102 transmits an approval to establish a light-based communication link directly with the endpoint. The light-based operations may be performed using Li-Fi technology.

In one or more embodiments, the server 102 is configured to verify information based on a light signature 146 of known information. Each time a user 118 performs a data exchange operation 104 using light-based operations, key light-based datapoints may be saved in one or more data repositories. The key light-based datapoints may be representative of transactional information associated with a user (e.g., user signature, retinal scan, initials). As a user 118 changes over time, the key light-based datapoints may change within predefined thresholds. A cognitive AI may be used to predict change tolerance for the thresholds. In this regard, the server 102 may be configured to quickly verify the user information 150 when transmitted to the server 102 using light-based operations given that light-based operations are faster to confirm a match between light signatures 146 than two sets of code-based data.

Example Process to Perform Light-Based Data Exchange Operations

FIG. 2 illustrates an example flowchart of a process 200 configured to perform light-based data exchange operations, in accordance with one or more embodiments. Modifications, additions, or omissions may be made to the process 200. The process 200 may comprise more, fewer, or other operations than those shown in FIG. 2. For example, operations may be performed in parallel or in any suitable order. While at times discussed as the server 102, the user devices 110, or components of any of thereof performing operations described in operations 202-234 in the process 200, any suitable system or components of the system 100 may perform one or more operations of the process 200. For example, one or more operations of the process 200 may be implemented, at least in part, in the form of instructions 132 of FIG. 1, stored on non-transitory, tangible, machine-readable media (e.g., a non-transitory computer readable medium such as server memory 130 of FIG. 1) that when run by one or more processors (e.g., the server processor 126 of FIG. 1) may cause the one or more processors to perform operations described in operations 202-234.

The process 200 starts at operation 202, where the server 102 receive a code-based data exchange request 136 (one of the data exchange requests 140) associated with first user information 150 from a user 118. The code-based data exchange request 136 may comprise the first user information 150 associated with a user profile 152 and data exchange information representative of a data exchange operation 104. At operation 204, the server 102 is configured to trigger a request for a retinal scan 142 of the user 118. In response to receiving the code-based data exchange request 136, the server 102 may be configured to trigger the request for the retinal scan 142 of the user 118. In some embodiments, the retinal scan 142 is received upon performing an optical scan of the user's retina in accordance with one or more photosensitive light accurate detection operations (e.g., via an optical sensor). At operation 206, the server 102 is configured to receive a result of the retinal scan 142 of the user 118 comprising second user information 150.

At operation 210, the server 102 is configured to determine the first user information 150 and the second user information 150 are indicative of a same user profile 152. In response to receiving the result of the retinal scan 142 of the user 118, the server 102 may be configured to determine whether the first user information and the second user information are associated with the same user profile 152. If the server 102 determines that the first user information 150 and the second user information 150 are indicative of a same user profile 152 (e.g., YES), the process 200 proceeds to operation 212. In response to determining that the first user information 150 and the second user information 150 are associated with the same user profile 152, determine that the code-based data exchange request 136 is authentic. If the server 102 determines that the first user information 150 and the second user information 150 are not indicative of a same user profile 152 (e.g., NO), the process 200 proceeds to operation 232. In response to determining that the first user information 150 and the second user information 150 are not associated with the same user profile 152, determine that the code-based data exchange request 136 is not authentic.

The process 200 may end at operations 212-220, where the server 102 may be configured to determine that the data exchange request 140 was authentic. At operation 212, the server 102 is configured to determine that the code-based data exchange request 136 is authentic. At operation 214, the server 102 is configured to convert the code-based data exchange request 136 to a light-based data exchange request 138. In conjunction with determining that the code-based data exchange request 136 is authentic, the server 102 may be configured to execute a cognitive AI model 160 configured to convert the code-based data exchange request 136 to the light-based data exchange request 138. At operation 216, the server 102 is configured to generate a light-guided contract 166 based on the light-based data exchange request 138. In some embodiments, the server 102 may be configured to generate the light-guided contract 166 based on the light-based data exchange request 138. The light-guided contract 166 may indicate that the user 118 associated with the user profile 152 is entitled to trigger the data exchange operation 104. At operation 218, the server 102 is configured to generate a light-based token 148 to initiate the data exchange operation 104 with the one or more decentralized networks 106. In some embodiments, the server 102 may be configured to generate the light-based token 148 to initiate the data exchange operation 104 with the decentralized networks 106. The process 200 may end at operation 220, where the server 102 is configured to transmit the light-based token 148 to the decentralized networks 106.

In one or more embodiments, the server 102 is configured to transmit the light-based token 148 to the decentralized networks 106. In conjunction with transmitting the light-based token 148 to the decentralized networks 106, the server 102 is configured to store a light signature 146 representative of the light-based token 148 in a light data repository (e.g., one of the databases 122). In conjunction with transmitting additional light-based tokens 148 related to the same user 118 to the decentralized networks 106, the server 102 may be configured to generate additional light signatures 146 representative of the additional light-based tokens 148. The server 102 may be configured to compare the additional light signatures 146 to previous light signatures 146 associated with the same user 118 and/or user profile 152. In response to determining that the light signatures 146 at least partially match to one another (e.g., a previous light signature 146 at least partially matched a new light signature 146), the server 102 may be configured to determine whether the additional light-based token 148 are already stored in the light data repository. In conjunction with transmitting the light-based tokens 148 to the decentralized networks 106, the server 102 may be configured to associate the light-based token 148 with the data exchange operation 104 in a light-based ledger 168.

The process 200 may end at operation 232 and operation 234, where the server 102 may be configured to determine that the data exchange request 140 was not authentic. At operation 232, the server 102 is configured to generate a report 170 indicating that the code-based data exchange request 136 is not authentic. At operation 234, the server 102 is configured to transmit the report 170 to a trusted device (a corresponding user device 110) associated with the user profile 152.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory operable to store:
one or more user profiles, each user profile comprising information about at least one user entitled to trigger one or more data exchange operations in a decentralized network; and
at least one processor communicatively coupled to the memory and configured to:
receive a first code-based data exchange request from a first user, the first code-based data exchange request comprising first user information associated with a first user profile and first data exchange information representative of a first data exchange operation;
in response to receiving the first code-based data exchange request, trigger a first request for a first retinal scan of the first user;
receive a first result of the first retinal scan of the first user, the first result comprising second user information;
in response to receiving the first result of the first retinal scan of the first user, determine whether the first user information and the second user information are associated with the first user profile;
in response to determining that the first user information and the second user information are associated with the first user profile, determine that the first code-based data exchange request is authentic;
convert the first code-based data exchange request to a first light-based data exchange request;
generate a first light-guided contract based on the first light-based data exchange request, the first light-guided contract indicating that the first user associated with the first user profile is entitled to trigger the first data exchange operation;
generate a first light-based token to initiate the first data exchange operation with the decentralized network; and
transmit the first light-based token to the decentralized network.

2. The system of claim 1, wherein the first retinal scan is performed in accordance with one or more photosensitive light accurate detection operations.

3. The system of claim 1, wherein the at least one processor is further configured to:
in conjunction with determining that the first code-based data exchange request is authentic, execute a cognitive artificial intelligence (AI) model configured to convert the first code-based data exchange request to the first light-based data exchange request.

4. The system of claim 1, wherein the at least one processor is further configured to:
receive a second code-based data exchange request from a second user, the second code-based data exchange request comprising third user information associated with a second user profile and second data exchange information representative of a second data exchange operation;
in response to receiving the second code-based data exchange request, trigger a second request for a second retinal scan of the second user;
receive a second result of the second retinal scan of the second user, the second result comprising fourth user information;
in response to receiving the second result of the second retinal scan of the second user, determine whether the third user information and the fourth user information are associated with the second user profile;
in response to determining that the third user information and the fourth user information are associated with the second user profile, determine that the second code-based data exchange request is authentic;
convert the second code-based data exchange request to a second light-based data exchange request;
generate a second light-guided contract based on the second light-based data exchange request, the second light-guided contract indicating that the second user associated with the second user profile is entitled to trigger the second data exchange operation;
generate a second light-based token to initiate the second data exchange operation with the decentralized network; and
transmit the second light-based token to the decentralized network.

5. The system of claim 4, wherein the at least one processor is further configured to:
in conjunction with transmitting the first light-based token to the decentralized network, store a first signature representative of the first light-based token in a light data repository; and
in conjunction with transmitting the second light-based token to the decentralized network, store a second signature representative of the second light-based token in the light data repository.

6. The system of claim 4, wherein the at least one processor is further configured to:
in conjunction with transmitting the first light-based token to the decentralized network, generate a first signature representative of the first light-based token;

store the first signature of the first light-based token in a light data repository;
in conjunction with transmitting the second light-based token to the decentralized network, generate a second signature representative of the second light-based token;
compare the first signature to the second signature; and
in response to determining that the first signature at least partially matches the second signature, determine that the second signature representative of the second light-based token is already stored in the light data repository.

7. The system of claim 1, wherein the at least one processor is further configured to:
receive a second code-based data exchange request from a second user, the second code-based data exchange request comprising third user information associated with a second user profile and second data exchange information representative of a second data exchange operation;
in response to receiving the second code-based data exchange request, trigger a second request for a second retinal scan of the second user;
receive a second result of the second retinal scan of the second user, the second result comprising fourth user information;
in response to receiving the second result of the second retinal scan of the second user, determine whether the third user information and the fourth user information are associated with the second user profile;
in response to determining that the third user information and the fourth user information are not associated with the second user profile, determine that the second code-based data exchange request is not authentic;
generate a report comprising that the second code-based data exchange request is not authentic; and
transmit the report to a trusted device associated with the second user profile.

8. The system of claim 1, wherein the at least one processor is further configured to:
in conjunction with transmitting the first light-based token to the decentralized network, associate the first light-based token with the first data exchange operation in a light-based ledger.

9. A method, comprising:
receiving a first code-based data exchange request from a first user, the first code-based data exchange request comprising first user information associated with a first user profile and first data exchange information representative of a first data exchange operation;
in response to receiving the first code-based data exchange request, triggering a first request for a first retinal scan of the first user;
receiving a first result of the first retinal scan of the first user, the first result comprising second user information;
in response to receiving the first result of the first retinal scan of the first user, determining whether the first user information and the second user information are associated with the first user profile;
in response to determining that the first user information and the second user information are associated with the first user profile, determining that the first code-based data exchange request is authentic;
converting the first code-based data exchange request to a first light-based data exchange request;
generating a first light-guided contract based on the first light-based data exchange request, the first light-guided contract indicating that the first user associated with the first user profile is entitled to trigger the first data exchange operation;
generating a first light-based token to initiate the first data exchange operation with a decentralized network; and
transmitting the first light-based token to the decentralized network.

10. The method of claim 9, wherein the first retinal scan is performed in accordance with one or more photosensitive light accurate detection operations.

11. The method of claim 9, further comprising:
in conjunction with determining that the first code-based data exchange request is authentic, executing a cognitive artificial intelligence (AI) model configured to convert the first code-based data exchange request to the first light-based data exchange request.

12. The method of claim 9, further comprising:
receiving a second code-based data exchange request from a second user, the second code-based data exchange request comprising third user information associated with a second user profile and second data exchange information representative of a second data exchange operation;
in response to receiving the second code-based data exchange request, triggering a second request for a second retinal scan of the second user;
receiving a second result of the second retinal scan of the second user, the second result comprising fourth user information;
in response to receiving the second result of the second retinal scan of the second user, determining whether the third user information and the fourth user information are associated with the second user profile;
in response to determining that the third user information and the fourth user information are associated with the second user profile, determining that the second code-based data exchange request is authentic;
converting the second code-based data exchange request to a second light-based data exchange request;
generating a second light-guided contract based on the second light-based data exchange request, the second light-guided contract indicating that the second user associated with the second user profile is entitled to trigger the second data exchange operation;
generating a second light-based token to initiate the second data exchange operation with the decentralized network; and
transmitting the second light-based token to the decentralized network.

13. The method of claim 12, further comprising:
in conjunction with transmitting the first light-based token to the decentralized network, storing a first signature representative of the first light-based token in a light data repository; and
in conjunction with transmitting the second light-based token to the decentralized network, storing a second signature representative of the second light-based token in the light data repository.

14. The method of claim 12, further comprising:
in conjunction with transmitting the first light-based token to the decentralized network, generating a first signature representative of the first light-based token;
storing the first signature of the first light-based token in a light data repository;

in conjunction with transmitting the second light-based token to the decentralized network, generating a second signature representative of the second light-based token;

comparing the first signature to the second signature; and in response to determining that the first signature at least partially matches the second signature, determining that the second signature representative of the second light-based token is already stored in the light data repository.

15. The method of claim 9, further comprising:

receiving a second code-based data exchange request from a second user, the second code-based data exchange request comprising third user information associated with a second user profile and second data exchange information representative of a second data exchange operation;

in response to receiving the second code-based data exchange request, triggering a second request for a second retinal scan of the second user;

receiving a second result of the second retinal scan of the second user, the second result comprising fourth user information;

in response to receiving the second result of the second retinal scan of the second user, determining whether the third user information and the fourth user information are associated with the second user profile;

in response to determining that the third user information and the fourth user information are not associated with the second user profile, determining that the second code-based data exchange request is not authentic;

generating a report comprising that the second code-based data exchange request is not authentic; and transmitting the report to a trusted device associated with the second user profile.

16. The method of claim 9, further comprising:

in conjunction with transmitting the first light-based token to the decentralized network, associating the first light-based token with the first data exchange operation in a light-based ledger.

17. A non-transitory computer readable medium storing instructions that when executed by a processor cause the processor to:

receive a first code-based data exchange request from a first user, the first code-based data exchange request comprising first user information associated with a first user profile and first data exchange information representative of a first data exchange operation;

in response to receiving the first code-based data exchange request, trigger a first request for a first retinal scan of the first user;

receive a first result of the first retinal scan of the first user, the first result comprising second user information;

in response to receiving the first result of the first retinal scan of the first user, determine whether the first user information and the second user information are associated with the first user profile;

in response to determining that the first user information and the second user information are associated with the first user profile, determine that the first code-based data exchange request is authentic;

convert the first code-based data exchange request to a first light-based data exchange request;

generate a first light-guided contract based on the first light-based data exchange request, the first light-guided contract indicating that the first user associated with the first user profile is entitled to trigger the first data exchange operation;

generate a first light-based token to initiate the first data exchange operation with a decentralized network; and transmit the first light-based token to the decentralized network.

18. The non-transitory computer readable medium of claim 17, wherein the first retinal scan is performed in accordance with one or more photosensitive light accurate detection operations.

19. The non-transitory computer readable medium of claim 18, wherein the instructions further cause the processor to:

receive a second code-based data exchange request from a second user, the second code-based data exchange request comprising third user information associated with a second user profile and second data exchange information representative of a second data exchange operation;

in response to receiving the second code-based data exchange request, trigger a second request for a second retinal scan of the second user;

receive a second result of the second retinal scan of the second user, the second result comprising fourth user information;

in response to receiving the second result of the second retinal scan of the second user, determine whether the third user information and the fourth user information are associated with the second user profile;

in response to determining that the third user information and the fourth user information are associated with the second user profile, determine that the second code-based data exchange request is authentic;

convert the second code-based data exchange request to a second light-based data exchange request;

generate a second light-guided contract based on the second light-based data exchange request, the second light-guided contract indicating that the second user associated with the second user profile is entitled to trigger the second data exchange operation;

generate a second light-based token to initiate the second data exchange operation with the decentralized network; and transmit the second light-based token to the decentralized network.

20. The non-transitory computer readable medium of claim 17, wherein the instructions further cause the processor to:

in conjunction with determining that the first code-based data exchange request is authentic, execute a cognitive artificial intelligence (AI) model configured to convert the first code-based data exchange request to the first light-based data exchange request.

* * * * *